United States Patent
Shah

(10) Patent No.: US 6,775,758 B2
(45) Date of Patent: Aug. 10, 2004

(54) BUFFER PAGE ROLL IMPLEMENTATION FOR PCI-X BLOCK READ TRANSACTIONS

(75) Inventor: Paras Shah, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 505 days.

(21) Appl. No.: 09/745,365

(22) Filed: Dec. 21, 2000

(65) Prior Publication Data

US 2002/0083257 A1 Jun. 27, 2002

(51) Int. Cl.[7] .............................................. G06F 12/00
(52) U.S. Cl. ..................... 711/201; 711/220; 711/171; 711/219; 710/305
(58) Field of Search ....................... 710/305; 711/201, 711/220, 171, 173, 219

(56) References Cited

U.S. PATENT DOCUMENTS

| | | | | |
|---|---|---|---|---|
| 5,289,470 A | * | 2/1994 | Chang et al. ................ | 711/173 |
| 5,465,374 A | * | 11/1995 | Dinkjian et al. ............. | 711/219 |
| 5,752,273 A | * | 5/1998 | Nemirovsky et al. ........ | 711/201 |
| 6,289,428 B1 | * | 9/2001 | Derrick et al. .............. | 711/201 |
| 6,330,623 B1 | * | 12/2001 | Wu et al. ..................... | 710/23 |
| 6,363,470 B1 | * | 3/2002 | Laurenti et al. ............. | 711/220 |
| 6,385,672 B1 | * | 5/2002 | Wang et al. .................. | 710/56 |
| 6,539,467 B1 | * | 3/2003 | Anderson et al. ........... | 711/219 |
| 6,581,129 B1 | * | 6/2003 | Buckland et al. ........... | 710/306 |

* cited by examiner

*Primary Examiner*—Donald Sparks
*Assistant Examiner*—Brian R. Peugh

(57) ABSTRACT

A computer system containing logic for processing a read block transaction from a PCI-X device. A technique is also disclosed for processing a read block transaction from a PCI-X device. The technique is defined by PCI-X specifications wherein the read block transaction is processed accordingly in a computer system. The technique determines whether the transaction is a read block and whether the transaction crosses a memory boundary. The technique also determines whether a page roll is required and administers one if it is required. Furthermore, the technique provides a means for reading and delivering the data to a PCI-X device.

32 Claims, 7 Drawing Sheets

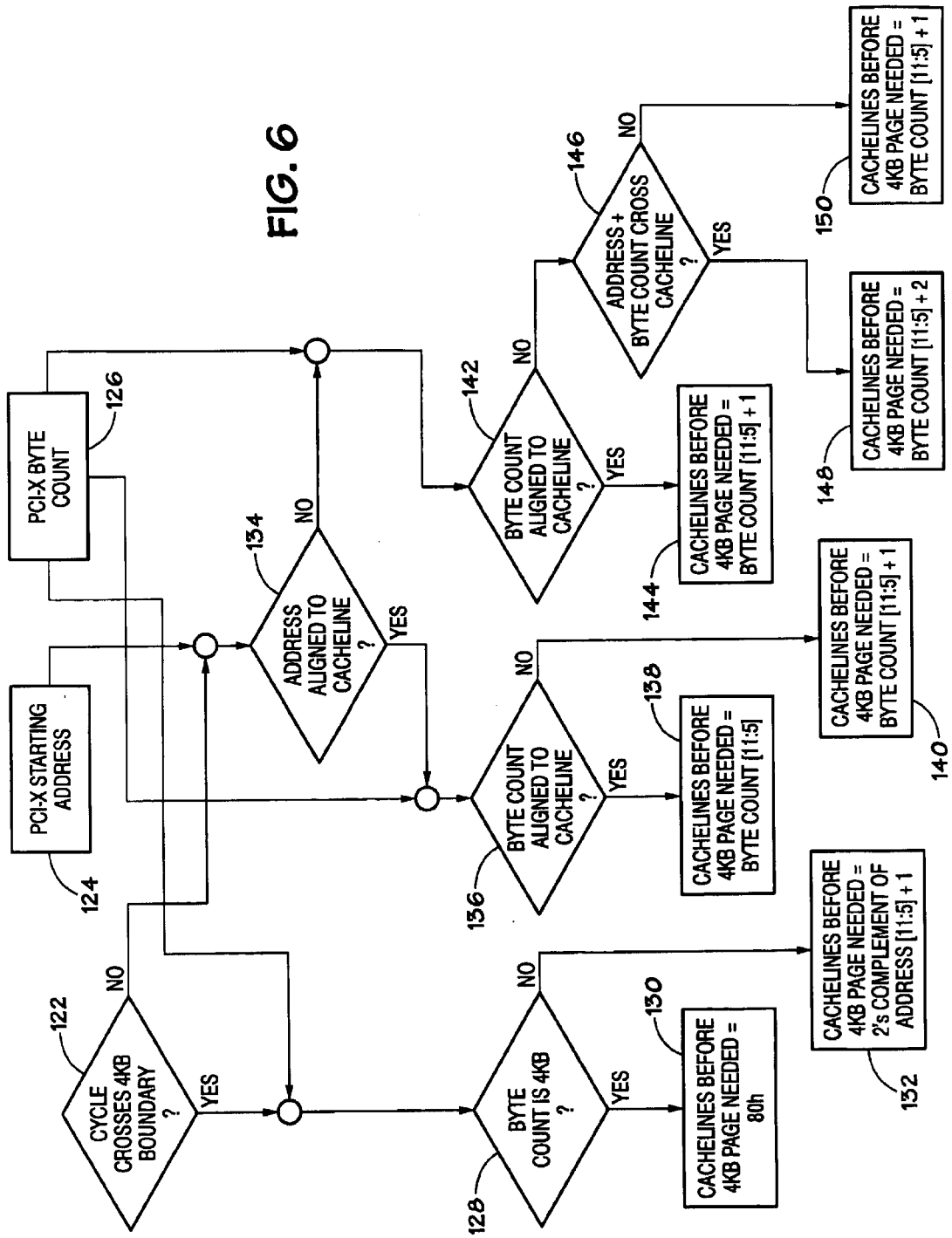

BUFFER PAGE ROLL IMPLEMENTATION FOR PCI-X BLOCK READ TRANSACTIONS

FIELD OF THE INVENTION

The present invention relates generally to PCI-X systems and, more particularly, to management of read transactions in PCI-X controlled systems. Even more particularly, the present invention provides a mechanism to process data transactions using a buffer page roll.

BACKGROUND OF THE RELATED ART

This section is intended to introduce the reader to various aspects of art, which may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

A conventional computer system typically includes one or more central processing units (CPUs) and one or more memory subsystems. Computer systems also include peripheral devices for inputting and outputting data. Some common peripheral devices include, for example, monitors, keyboards, printers, modems, hard disk drives, floppy disk drives, and network controllers.

One of the important factors in the performance of a computer system is the speed at which the CPU operates. Generally, the faster the CPU operates, the faster the computer system can complete a designated task. One method of increasing the speed of a computer is using multiple CPUs, commonly known as multiprocessing. However, the addition of a faster CPU or additional CPUs can result in different increases in performance among different computer systems. Although it is the CPU that executes the algorithms required for performing a designated task, in many cases it is the peripherals that are responsible for providing data to the CPU and storing or outputting the processed data from the CPU. When a CPU attempts to read or write to a peripheral, the CPU often "sets aside" the algorithm that is currently executing and diverts to executing the read/write transaction (also referred to as an input/output transaction or an I/O transaction) for the peripheral. As can be appreciated by those skilled in the art, the length of time that the CPU is diverted is typically dependent on the efficiency of the I/O transaction.

Although a faster CPU may accelerate the execution of an algorithm, a slow or inefficient I/O transaction process associated therewith can create a bottleneck in the overall performance of the computer system. As the CPU becomes faster, the amount of time executing algorithms becomes less of a limiting factor compared to the time expended in performing an I/O transaction. Accordingly, the improvement in the performance of the computer system that could theoretically result from the use of a faster CPU or the addition of additional CPUs may become substantially curtailed by the bottleneck created by the I/O transactions. Moreover, it can be readily appreciated that any performance degradation due to such I/O bottlenecks in a single computer system may have a stifling affect on the overall performance of a computer network in which the computer system is disposed.

As CPUs have increased in speed, the logic controlling I/O transactions has evolved to accommodate these transactions. Thus, most I/O transactions within a computer system are now largely controlled by application specific integrated circuits (ASIC). These ASICs contain specific logic to perform defined functions. For example, Peripheral Component Interconnect (PCI) logic is instilled within buses and bridges, which govern I/O transactions between peripheral devices and the CPU. Today, PCI logic has evolved into the Peripheral Component Interconnect Extended (PCI-X) to form the architectural backbone of the computer system. PCI-X logic has features that improve upon the efficiency of communication between peripheral devices and the CPU. For instance, PCI-X technology increases bus capacity to more than eight times the conventional PCI bus bandwidth. For example, a 133 MB/s system with a 32 bit PCI bus running at 33 MHz is increased to a 1066 MB/s system with the 64 bit PCI bus running at 133 MHz.

An important feature of the new PCI-X logic is that it can provide backward compatibility with PCI enabled devices at both the adapter and system levels. Backward compatibility allows PCI controlled devices to operate with PCI-X logic. Although the devices will operate at the slower PCI speed and according to PCI specifications, the devices may be compatible to the new logic governing PCI-X transactions. Furthermore, PCI-X devices will run according to PCI-X specifications, while PCI devices will operate according to PCI specifications without having an adverse affect on the PCI-X devices.

PCI-X logic allows a requesting device to make only one data request and relinquish the bus, rather than holding the bus to poll for a response. PCI-X logic also enables the requesting device to specify in advance the specific number of bytes requested, thus eliminating the inefficiency of prefetches. Additionally, PCI-X bus logic incorporates an attribute phase, split transaction support, optimized wait states, and standard block size movement.

PCI-X logic provides an attribute phase that uses a 36-bit attribute field which describes bus transactions in more detail than the conventional PCI bus logic. This field includes information about the size of the transaction, the ordering of transactions, and the identity of the transaction initiator. Furthermore, the attribute field in the PCI-X standard incorporates the transaction byte count, which allows the bridge to determine exactly how much data to fetch from the memory. The attribute phase feature of PCI-X logic also incorporates relaxed ordering, sequence number, transaction byte count, and non-cache-coherent transactions.

As PCI-X logic is incorporated into the next generation of buses, it becomes important to handle transaction requests efficiently. Generally, peripheral devices initiating read block transactions target the PCI-X bridge. As a transaction is initiated, a buffer is allocated within the bridge. The bridge stores the information about the transaction, such as its starting address, length and so on. In the PCI-X specification, split transactions require the bridge logic to generate a reply transaction with the requested data. Thus, the PCI-X bridge stores the transaction in a queue and replies to the transaction according to priority. Normally, a buffer holding a read block transaction is restricted to containing data within a certain memory boundary, and these queues have limitations on the address boundaries a transaction can cross. Particularly, if the data string crosses a memory boundary then the transaction will not be completed properly. Instead, it will be delivered to the requester incomplete. Although PCI-X specification allows read transactions to cross any address boundary, only the data that does not cross the memory boundary will be delivered to the requester.

The present invention may address one or more of the problems discussed above.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In accordance with one aspect of the present invention, there is provided a computer system that provides ordering of a sequence of events to complete a transaction. When a data transaction is initiated to a computer system, a series of events occurs to efficiently reply to the transaction. At the time a transaction is made, the system logic inquires whether the transaction is governed by PCI-X specifications. Specifically, the PCI-X transaction inquiry generally occurs at the bridge or bus level. As a transaction is initiated, a buffer is allocated for the storage of data. If the transaction is governed by PCI-X specifications rather than the conventional PCI specifications, the system determines whether the transaction is a read block transaction. Next, the data requested is separated into a part before a memory boundary and a second part after the memory boundary. The data within the first part of the memory boundary is read and returned to the requester. Once the data within the first part of the memory boundary is returned to the requester, the system initiates a page roll., whereby the data which crosses the memory boundary is read and returned to the requester.

The invention monitors the data flow, delivers the data within the memory boundary to the initiator, and retains the data, which crosses the memory boundary. As the data is returned to the requester, the invention replaces the starting address of the separated data string with the memory boundary address. The invention also replaces the number of bytes requested, with the number of bytes beyond the memory boundary. The system reads the remaining data requested and delivers it to the requester. This completes the PCI-X transaction.

In accordance with another aspect of the present invention, there is provided a computer system that provides ordering of a sequence of events for a specific transaction using a plurality of buffers. Specifically, the system allocates a plurality of buffers for a single PCI-X transaction that crosses a memory boundary. As a transaction is initiated, two buffers are allocated to a single read block transaction. Moreover, in this particular embodiment, a page roll is not required, but instead the data is read using the two buffers. The data requested is stored within a plurality of buffers, and returned to the requester, according to the PCI-X ordering rules.

BRIEF DESCRIPTION OF THE DRAWINGS

The foregoing and other advantages of the invention will become apparent upon reading the following detailed description and upon reference to the drawings in which:

FIG. 6 illustrates a flow chart depicting an algorithm for calculating the number of cachelines required before a memory boundary;

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
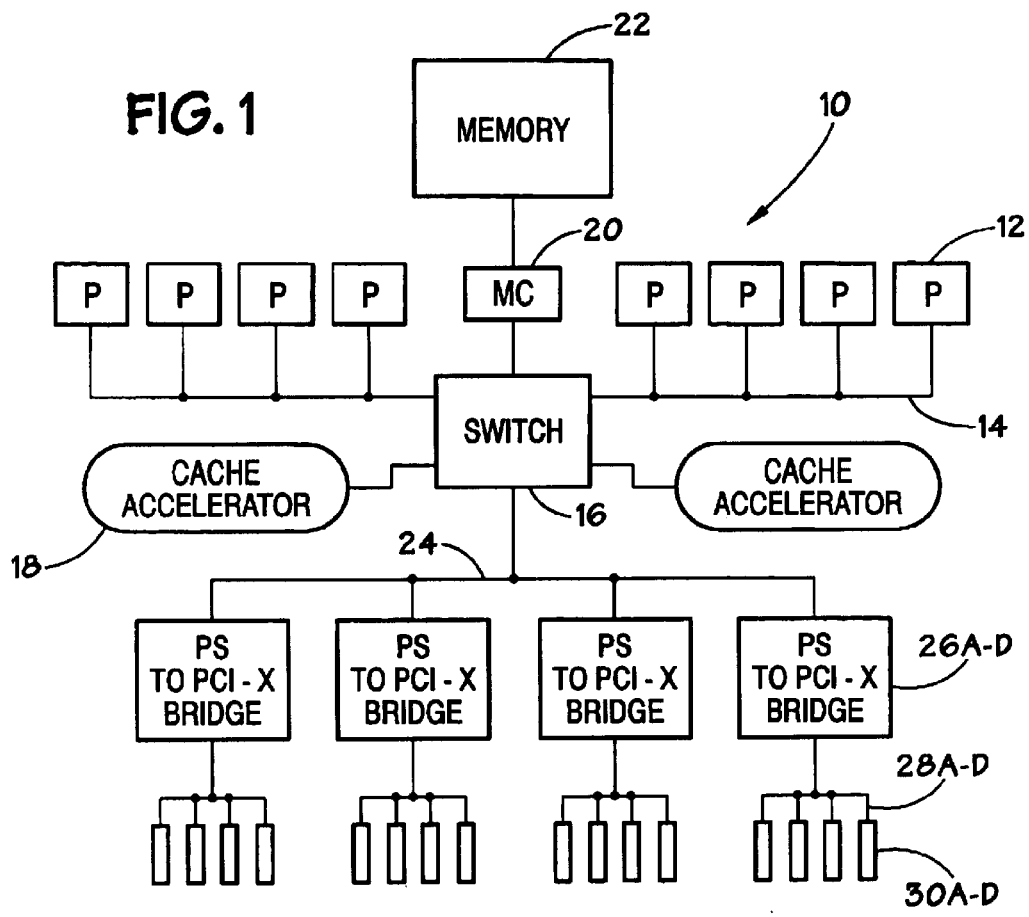
FIG. 1 illustrates a diagram of an exemplary computer system in accordance with the present invention.

Turning now to the drawings, and referring initially to FIG. 1, a multiprocessor computer system, for example a Proliant 8500 PCI-X from Compaq Computer Corporation, is illustrated and designated by the reference numeral 10. In this embodiment of the system 10, multiple processors 12 control many of the functions of the system 10. The processors 12 may be, for example, Pentium, Pentium Pro, Pentium II Xeon (Slot-2), or Pentium III Xeon processors available from Intel Corporation. However, it should be understood that the number and type of processors are not critical to the technique described herein and are merely being provided by way of example.

Typically, processors 12 are coupled to a processor bus 14. As instructions are sent and received by the processors 12, the processor bus 14 transmits data between the individual processors 12 and a switch 16. The switch 16 directs signals between the processor bus 14, cache accelerator 18, and a memory controller 20. Although a crossbar switch is shown in this embodiment, any suitable type of switch may be used in the operation of the system 10. Generally, the switch 16 couples to the processor bus 14, cache accelerator 18, and the memory controller 20. When instructions are sent from an input source, the switch 16 directs the instructions towards either the processor bus 14, cache accelerator 18, or the memory controller 20.

The memory controller 20 is coupled to the switch 16 and the memory 22. When data needs to be retrieved from the memory 22, the instructions are sent via the memory controller 20 to request information from the memory 22. The memory controller 20 may be of any type suitable for such a system 10. It should be understood that the number and type of memory, switches, memory controllers, and cache accelerators are not critical to the technique described herein, and are merely being provided by way of example.

The memory 22 in the system 10 is generally divided into groups of bytes called cachelines. Bytes in a cacheline may comprise several variable values. Cachelines in the memory 22 are moved to the cache for use by the processors 12 whenever the processors 12 need one of the values stored in that particular cacheline. Each location within the memory 22 is permanently labeled with a unique address. Access to a particular location is then obtained by specifying the address of the data.

The switch is also coupled to an Input/Output (I/O) bus 24. The I/O bus 24 is coupled to PCI-X bridges 26A–D. Further, each PCI-X bridge 26A–D is coupled to multiple PCI-X buses 28A–D. Finally, each PCI-X bus 28A–D terminates at a series of slots or I/O interfaces 30A–D. The PCI-X bridges 26A–D contain logic that govern many input/output transactions or requests. Generally, each of the PCI-X bridges 26A–D is an application specific integrated circuit (ASIC). The PCI-X bridges 26A–D may include address and data buffers, as well as arbitration and bus master control logic for the PCI-X buses 28A–D. The PCI-X bridges 26A–D may also include miscellaneous system logic. These miscellaneous logical devices may include counters and timers, an interrupt controller for both the PCI-X buses 28A–D and I/O bus 24, and power management logic.

Generally, a transaction is initiated by a requester, i.e., a peripheral devices coupled to one of the I/O interfaces 30A–D. For example, an operator may initiate a transaction using, for instance, tape drives, CD-ROM drives, or other peripheral storage devices. If the transaction is conducted through a peripheral device (not shown) that does not have PCI-X capabilities, the PCI-X buses 28A–D and the PCI-X bridges 26A–D are capable of administering the transaction using PCI specifications. As a transaction is initiated by a peripheral device, the I/O interface 30A–D checks whether PCI-X or PCI specifications are used to manage the transaction. The transaction is then ordered within the PCI-X bus 26A–D and transmitted to the PCI-X bridge 26A–D. The scope of the transaction is reviewed, and the necessary data is obtained from the memory 22 and returned to the requester.

Figure 2:
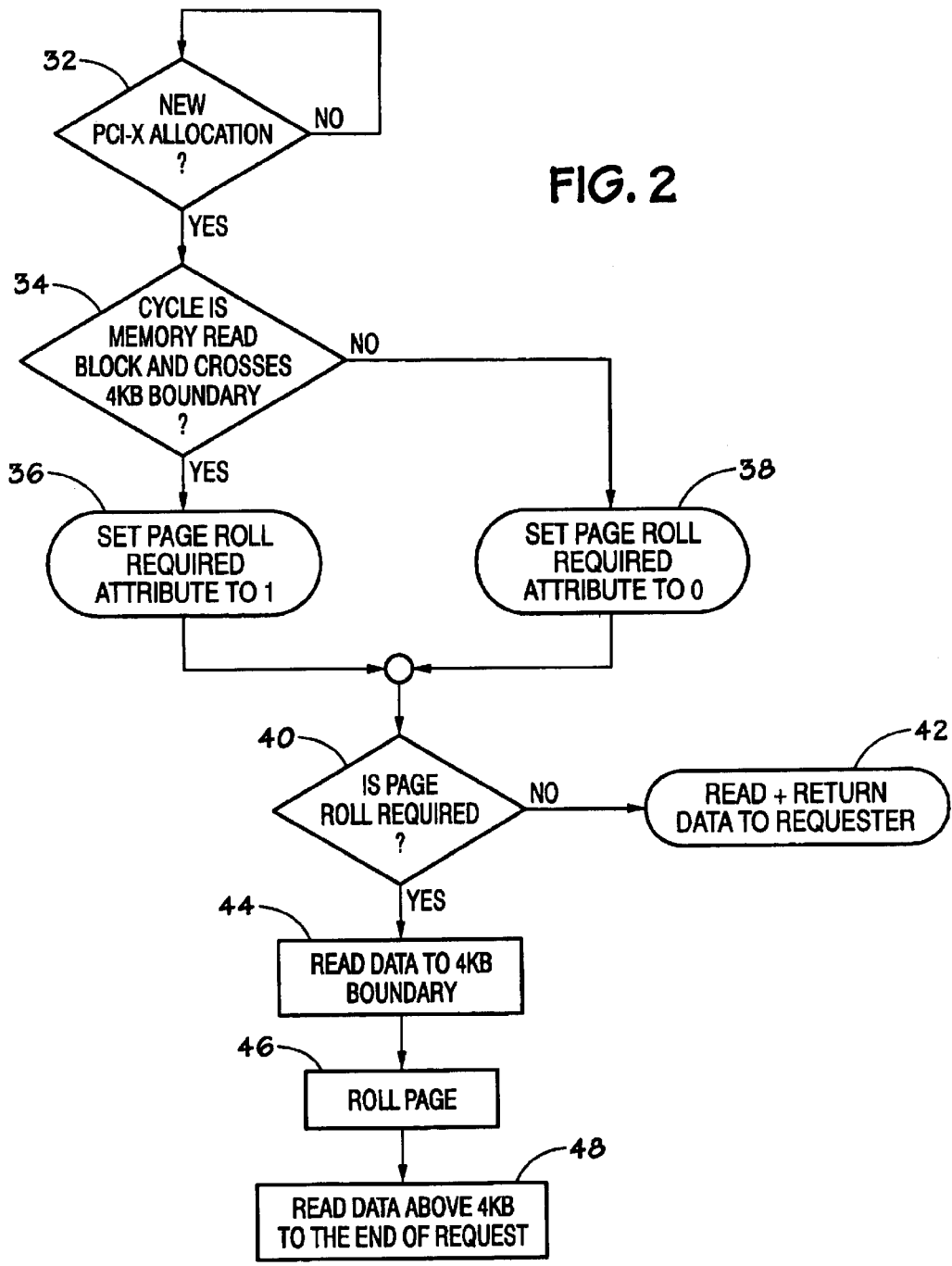
FIG. 2 illustrates a flow chart of one embodiment of a technique for processing a PCI-X read transaction involving a page roll detection method.

FIG. 2 illustrates a flowchart, which represents PCI-X logic for page roll detection. In this particular embodiment, bridges 26A–D contain the logic depicted in FIG. 2, however the logic may be located at any suitable place within the system 10. Generally, at the time a read block transaction is allocated a buffer, the logic within the PCI-X bridge 26A–D inquires whether the read block transaction is governed by a PCI-X transaction thereby granting a PCI-X allocation (block 32). If the bridge 26A–D does not detect a PCI-X transaction, then the bridge 26A–D performs a cyclical function to check for a new PCI-X transaction. Once the bridge 26A–D allocates a buffer to the transaction, the bridge 26A–D logic then inquires into whether the transaction is a memory read block transaction that crosses a memory boundary (block 34). It should be noted that a buffer is allocated once a new transaction is registered within the bridge 26A–D. In the present embodiment, the memory boundary level is set every 4 KB, however, the boundary address may be set at any level suitable to the system 10.

If the bridge 26A–D detects a memory read block transaction and the transaction crosses a 4 KB memory boundary, then a page roll attribute is set to a logical one (block 36). However, if the bridge 26A–D does not detect a memory read block transaction, or if the 4 KB memory boundary is not crossed by the requested data, then the page roll attribute is set to a logical zero (block 38). Next, the bridge 26A–D checks the page roll attribute setting (block 40). If the page roll attribute is set to a logical zero, then normal PCI-X logic functions by retrieving the data and storing it in the buffer so that it may be delivered to the requester (block 42). If the page roll attribute is set to a logical one, then the data requested is retrieved up to the 4 KB boundary and stored in the buffer (block 44). After that portion of the data has been read and returned to the requester, a page roll occurs (block 46). Finally, the data above the 4 KB boundary is read into the buffer, and delivered to the requester to complete the transaction (block 48).

Figure 3:
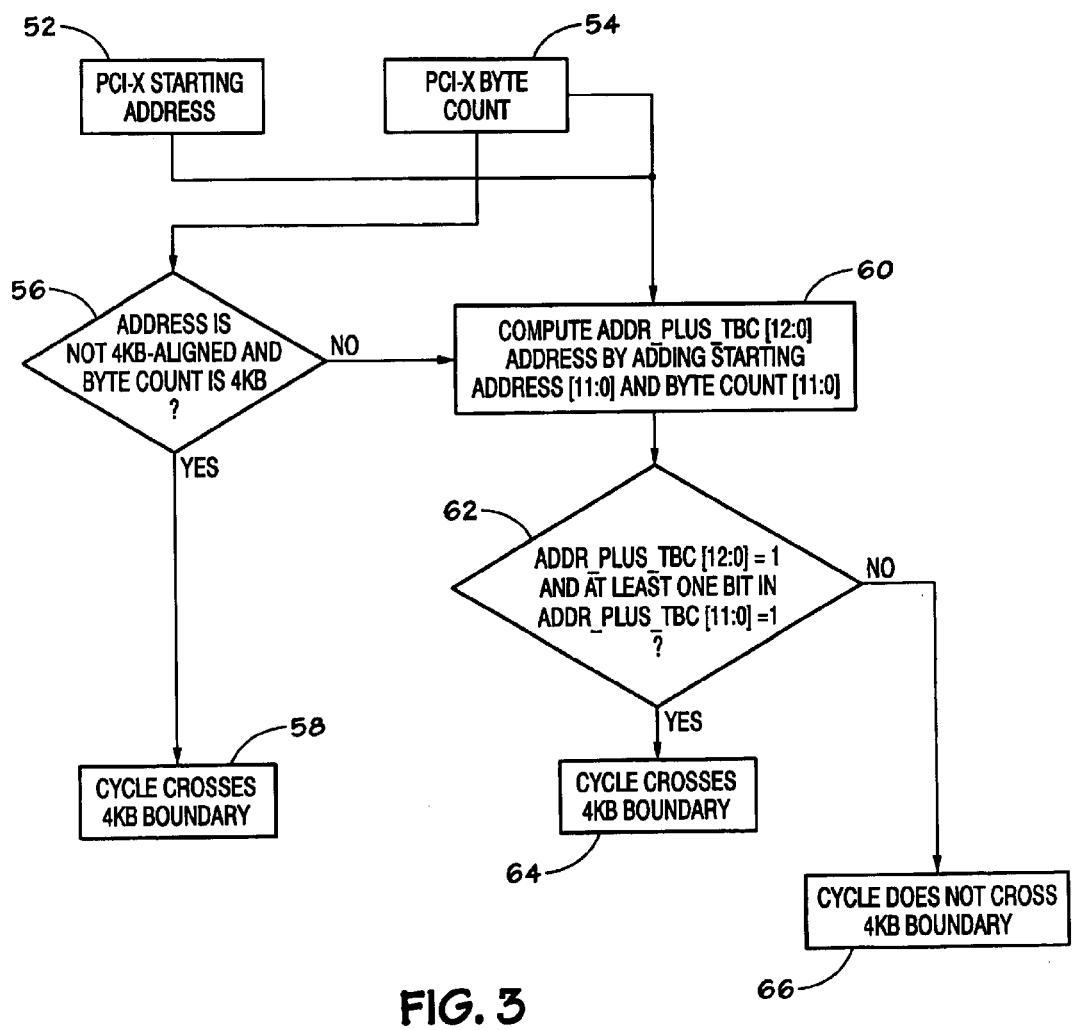
FIG. 3 illustrates a flow chart of one embodiment of an operation described in FIG. 2 for the page roll detection method.

The determination of whether a memory read block transaction crosses a memory boundary (Block 34 of FIG. 2) may be represented by a logic flowchart as illustrated in FIG. 3. Two scenarios may be checked to compute whether the transaction crosses the memory boundary. In the first scenario, if the PCI-X starting address (block 52) is not aligned to the 4 KB boundary and the PCI-X byte (block 54) count is 4 KB (block 56), then the transaction crosses a 4 KB memory boundary (block 58). Thus, the page roll attribute is set to a logical one. However, if the address is aligned to the 4 KB boundary and the byte count is 4 KB, then the transaction does not cross the memory boundary. The bridge 26A–D determines whether the transaction crosses the memory boundary by adding the starting address and the byte count of the transaction (block 60). Thus, the page roll attribute is set to a logical zero so that the bridge 26A–D reads and delivers the data from the starting address to the memory boundary (block 38).

The second scenario takes place when the PCI-X starting address (block 52) and the PCI-X byte count (block 54) are added (block 60) to determine whether a transaction crosses the memory boundary. Block 62 illustrates the algorithm. If bit 12 has a logical value of one and at least one bit from 11 through 0 is a logical one, then the transaction crosses the 4 KB memory boundary (block 64). However, if the above condition is not true, then the transaction does not cross the memory boundary (block 66). If the transaction does not cross the memory boundary, then a page roll is not utilized. Accordingly, the data is read and delivered to the requester without initiating a page roll.

Figure 4:
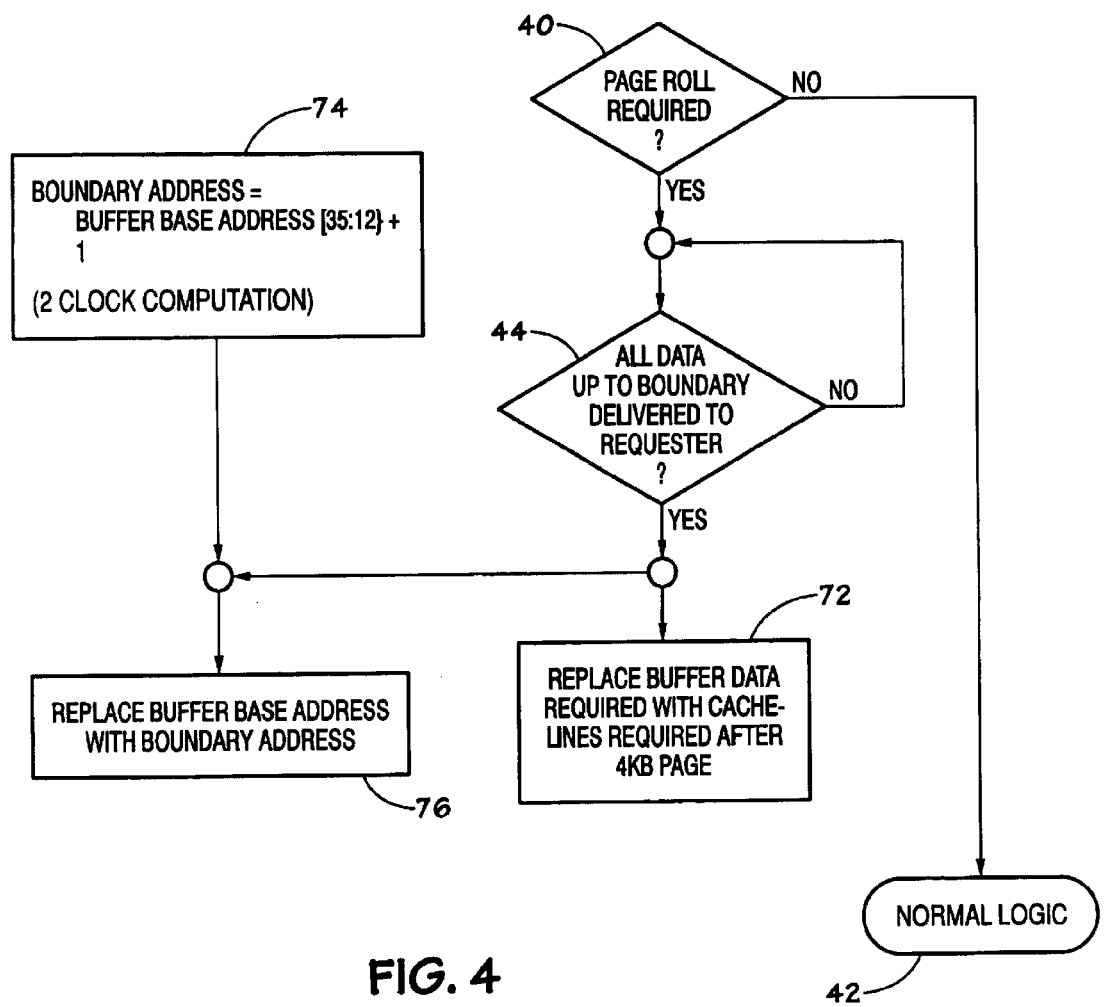
FIG. 4 illustrates a flow chart depicting logic for a page roll generation.

FIG. 4 illustrates a flow chart depicting a buffer page roll implementation method for PCI-X read block transactions. More particularly, FIG. 4 illustrates the actions taken for the generation of a page roll. After the bridge 26A–D checks whether a page roll is required (block 40) and determines that a page roll is necessary, all data up to the boundary level is delivered to the requester (block 44). However, if a page roll is not required, then normal logic controls (block 42). After the data within the boundary address is delivered to the requester a page roll occurs. The starting address of the buffer is given a new address within the memory 22. This new address is the boundary address (block 76). The number of cachelines required is set to the number of cachelines needed after the 4 KB memory boundary (block 72).

The bridge 26A–D logic computes the memory boundary address by taking the buffer base address bits and adding one (block 74). This computation may take up to two clock cycles. Subsequently, the buffer base address may be replaced with the memory boundary address (block 76). Once all the data up to the memory boundary has been delivered to the requester, the required buffer data may be replaced with the required amount of cachelines after the memory boundary page (block 72). The total number of cachelines needed to satisfy a PCI-X transaction is discussed below.

As mentioned above, memory 22 is generally divided into groups of bytes called cachelines. Within the memory 22 a certain number of cachelines are located within the memory boundary. Therefore, for a page roll to take place, the number of cachelines requested by an operator is determined to exceed the memory boundary. For example, a 4 KB boundary maintains a certain number of cachelines, and when the requested amount exceeds the boundary, a page roll is initiated. The algorithm for computing the number of cachelines used to implement a page roll is shown in FIG. 5.

Figure 5:
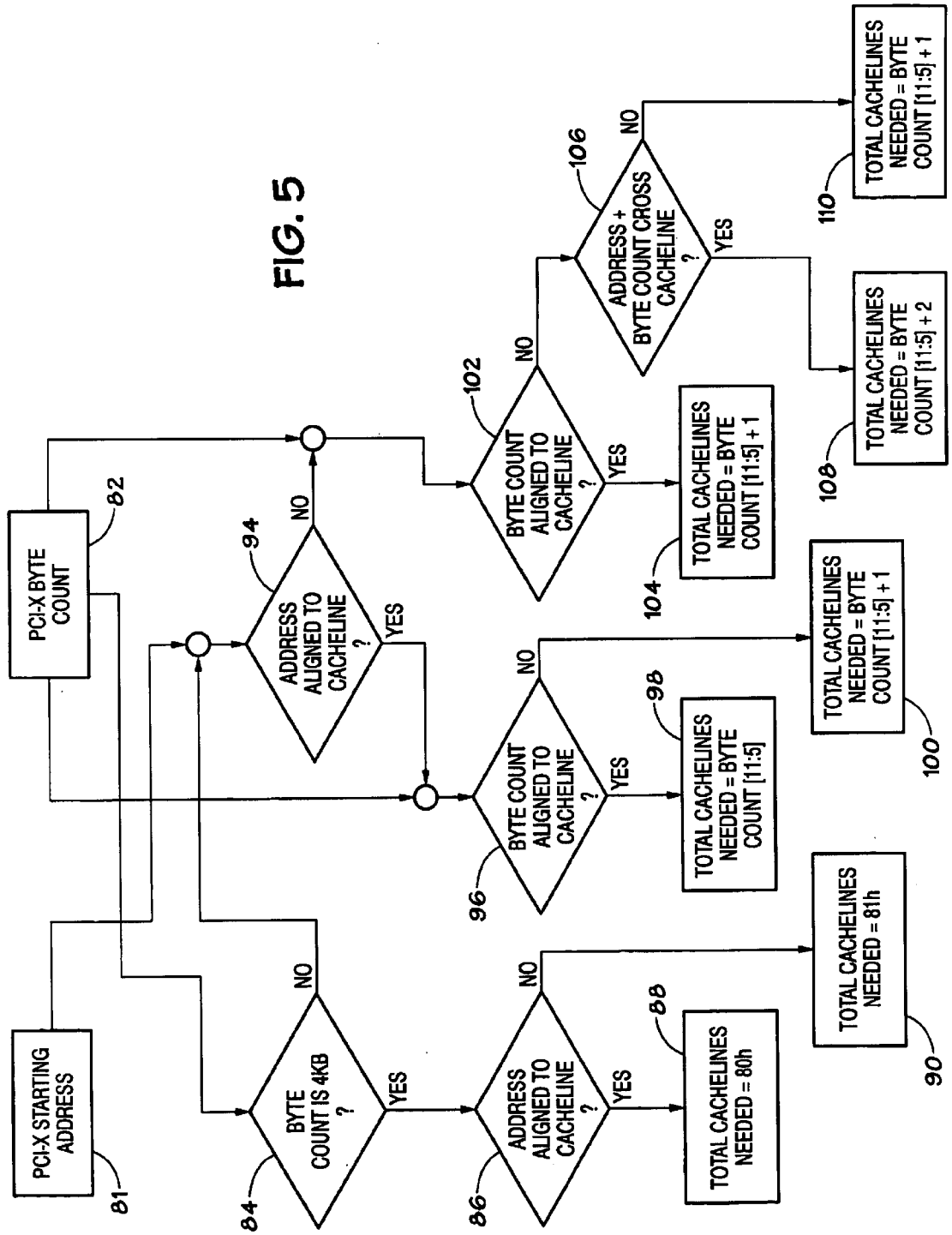
FIG. 5 illustrates a flow chart depicting an algorithm for calculating the total number of cachelines.

FIG. 5 illustrates a flow chart for computing the total number of cachelines used to implement a page roll for a PCI-X read transaction. It should be noted again that determining whether a transaction crosses a memory boundary utilizes the PCI-X starting address (block 81) and the PCI-X byte count (block 82). If the PCI-X byte count (block 82) is 4 KB (block 84) and the PCI-X starting address (block 81) aligns to a cacheline (block 86), then the total cachelines used equals 80 h (block 88). However, if the address is not aligned to the cacheline, then the total cachelines used equals 81 h (block 90).

If the starting address (block 81) is aligned to the cacheline (block 94), then bridge 26A–D determines whether the byte count (block 82) is aligned to the cacheline (block 96). Thus, if the byte count aligns to the cacheline, then the total cachelines equal the PCI-X byte count (block 98). However, if the byte count does not align to the cacheline, then the total cachelines equal the byte count plus one (block 100). not equal to the memory boundary, then the bridge 26A–D continues to check whether the byte count is aligned to the cacheline (block 102). The same function occurs if the address is aligned to the cacheline (block 96).

If starting address is not aligned to the cacheline (block 94) then the bridge 26A–D determines whether the byte count is aligned to the cacheline (block 102). If the byte count does align to the cacheline, then the total cacheline equal the byte count plus one (block 104). However, if the byte count is not aligned to a cacheline (block 102), then the bridge 26A–D determines whether the sum of the starting address and the byte count crosses the cacheline (block 106). Therefore, if the sum of the starting address and byte count cross the cacheline, the total cachelines equal the byte count plus two (block 108). However, if the sum of the starting address and the byte count do not cross the cacheline, then the total cachelines equal the byte count plus one (block 110). Although the above embodiment uses a 4 KB boundary, other levels may be used, and the example set above is not limited by any particular memory boundary limit, for example memory boundary levels may include 4 KB, 8 KB, and 16 KB.

FIG. 6 illustrates a flow chart demonstrating an exemplary algorithm for calculating the number of cachelines before the memory boundary. In this example a 4 KB boundary is used, however different boundary levels, for example 8 KB, 16 KB, 32 KB, etc. may be used. The bridge 26A–D determines whether the transaction crosses the memory boundary (block 122) and determines the number of cachelines needed before and after the memory boundary using the PCI-X starting address (block 124) and the PCI-X byte count (block 126). If the transaction crosses the 4 KB boundary (block 122), and if the PCI-X byte count (block 126) is equal to the 4 KB (block 128), then the cachelines before the 4 KB boundary equals 80 h (block 130). Although if the byte count is not 4 KB, (block 128) then the cachelines before the 4 KB page equals a twos complement of the address plus one (block 132).

On the other hand, if the transaction never crosses the 4 KB boundary (block 122), then the system 10 checks whether the address aligns with a cacheline (block 134). Furthermore, if the address is aligned to the cacheline, then the byte count is checked to determine whether it aligns to a cacheline (block 136). If the byte count is aligned to the cacheline, then the cachelines before the 4 KB boundary page equals the byte count (block 138). The cachelines before the 4 KB boundary page equals the byte count plus one (block 140), if the byte count is not aligned to the cacheline (136).

If the transaction does not cross the 4 KB boundary (block 122), and the address is not aligned to the cacheline (block 134), then the bridge 26A–D checks whether the byte count is aligned to the cacheline (block 142). If the byte count is aligned, then the cachelines before the 4 KB boundary page equals the byte count plus one (block 144). Now, if the byte count does not align to the cacheline, then the starting address and the byte count are added together (block 146). If the starting address and the byte count crosses the cacheline, then the cachelines before the 4 KB boundary equal the byte count plus two (block 148). However, if it does not cross the cacheline, then the cachelines before the 4 KB boundary equal the byte count plus one (block 150). As mentioned above, it should be understood that the technique is not limited to the 4 KB boundary and is merely being provided by way of example. For instance, a 8 KB boundary, 16 KB boundary or any other such value may be used to accomplish these goals.

In an alternative embodiment of the present invention, a page roll is not used. Instead of a page roll, a transaction may be allocated two buffers if the transaction is a memory read block transaction and crosses a memory boundary. A single read block transaction occupies two buffers inside the bridge 26A–D, and the data for the entire transaction is returned in address order. Allocating two buffers also may require additional synchronization logic to ensure that data is returned in the order required by the PCI-X specification. As with the previous embodiment, the advantage of this alternative embodiment is that all the data is read and delivered to the requester. Whereas, prior to the present techniques only the data read to the boundary could be returned to the requester. However, the disadvantage to this embodiment as compared to the previous embodiment is that it uses additional space within the bridge 26A–D. Because space within the bridge 26A–D is limited, additional transactions may not be serviced until the transaction using two buffers has been processed.

Figure 7:
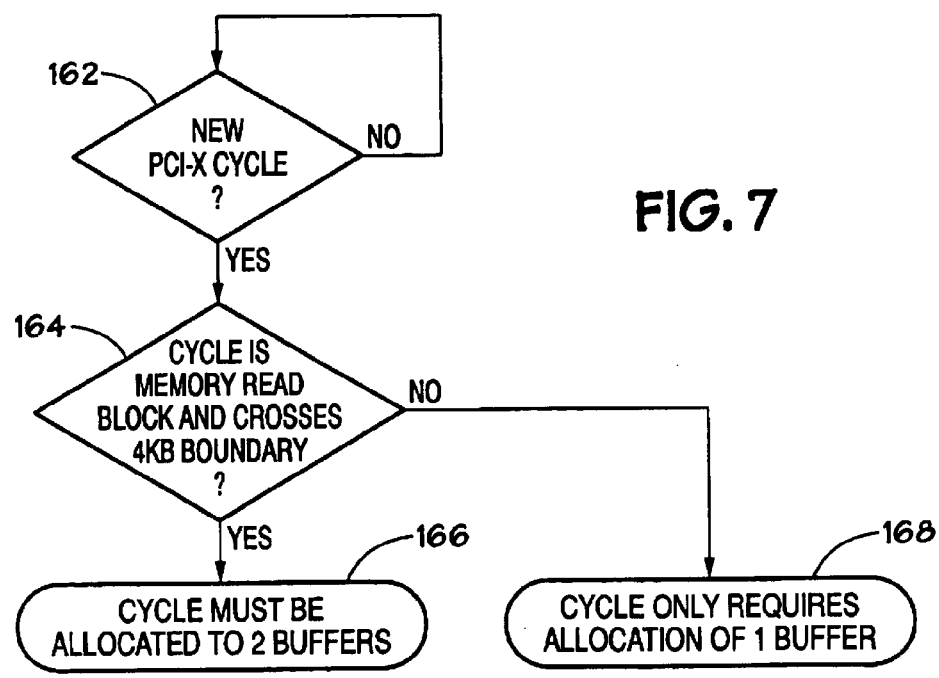
FIG. 7 illustrates a flow chart of an alternative embodiment depicting a technique for processing a PCI-X read transaction involving the use of two buffers.

FIG. 7 illustrates a flow chart demonstrating a dual buffer method for allocating PCI-X transactions that cross address boundaries within a buffer queue. When a new PCI-X transaction is detected (block 162), the bridge 26A–D determines whether the transaction is a memory read block transaction that crosses a 4 KB memory boundary (block 164). FIG. 3 illustrates the steps taken by the bridge 26A–D to determine whether the transaction is a memory read block transaction that crosses the memory boundary. Although a page roll is not utilized, this technique also incorporates the algorithm in FIG. 5 and FIG. 6 to determine whether a second buffer is required.

If the bridge 26A–D determines that the transaction is a memory read block transaction that crosses the 4 KB memory boundary, then two buffers are allocated for the transaction (block 166). However, if the bridge 26A–D determines that the transaction is not a memory read block transaction or does not cross the 4 KB boundary, then the transaction is allocated only one buffer (block 168). Thus, the data stored within the single buffer is read and delivered to the requester according to normal operation. It should be noted that logical devices within bridge 26A–D determine whether two buffers need to be allocated for the read block transaction. Determination is made as to whether the transaction crosses the memory boundary according to FIG. 3. Additionally, FIG. 5 and FIG. 6 illustrate the specific calculations utilized by the logic devices to determine if the transaction crosses the memory boundary. Thus, once the determination is made, for instance, if the memory boundary is crossed, then an additional buffer is allocated. However, if the memory boundary is not crossed by the read block transaction, then an additional buffer is not allocated.

Figure 8:
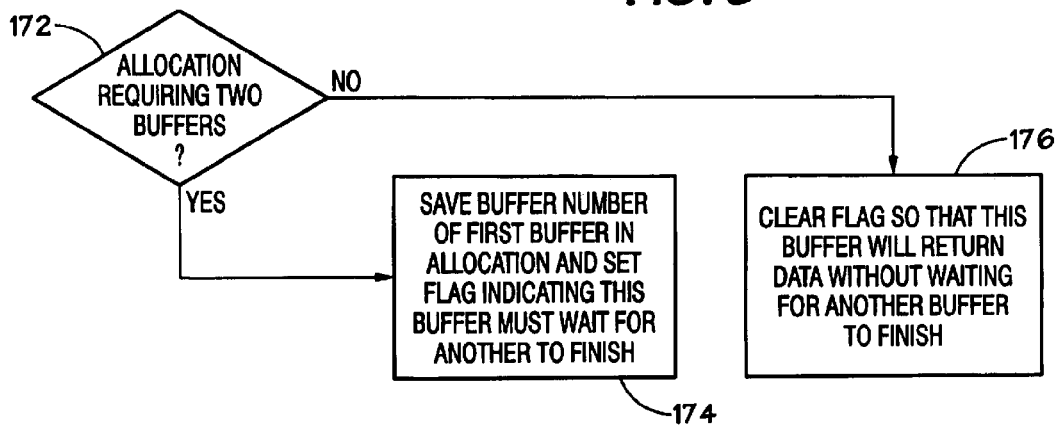
FIG. 8 illustrates a flow chart depicting synchronization logic when two buffers are allocated to a single transaction in the embodiment of FIG. 7.

FIG. 8 illustrates a flow chart depicting logic to ensure the second buffer delivers data after the first buffer has completed delivering the requested data. At the time of allocation, if the transaction uses an allocation of two buffers (block 172), then the buffer number of the first buffer in the allocation is saved, and a mark is set indicating the second buffer to wait for the first buffer to finish (block 174). However, if one buffer is sufficient for the read block transaction, then the mark is cleared so that the buffer will return the data without waiting for another buffer to finish (block 176).

Figure 9:
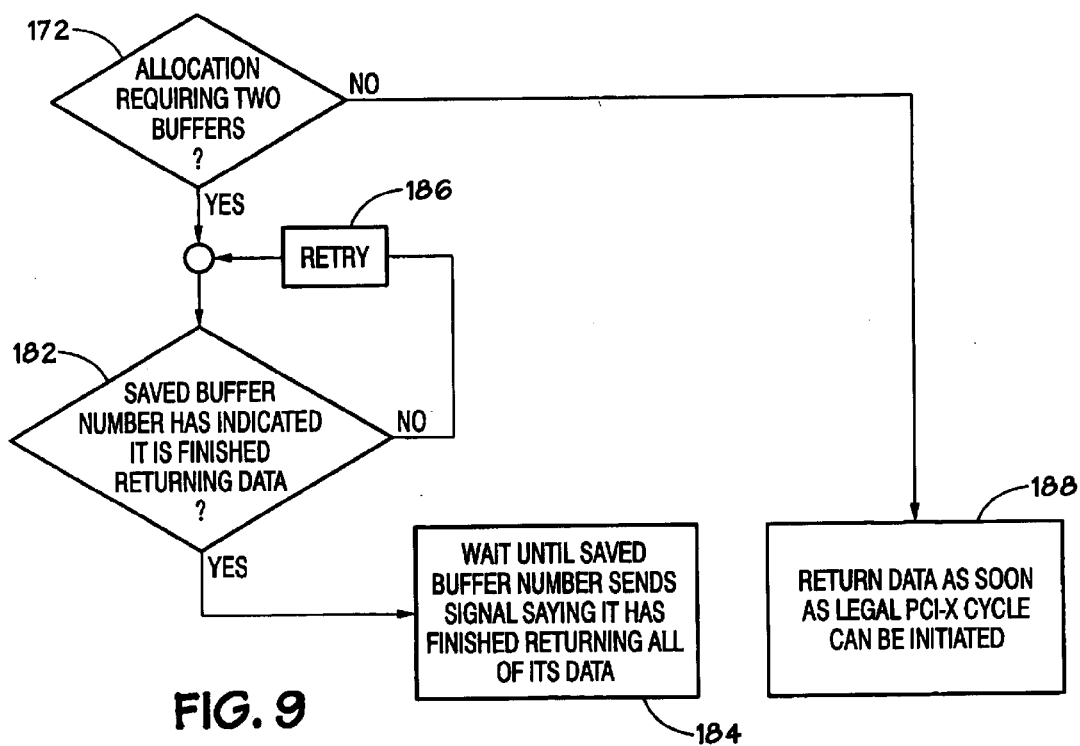
FIG. 9 illustrates a flow chart depicting synchronization logic after allocation of two buffers to a single transaction in the embodiment of FIG. 7.

FIG. 9 illustrates a flow chart of logic to ensure that a secondary buffer reads and delivers data after a first buffer has completed all data delivery requirements. If the read block transaction uses two buffers (block 172), and then the saved buffer number is used by the bridge 26A–D to determine whether the first buffer has finished returning the data (block 182). For instance, once the data is read from the staffing address to the memory boundary, all data is returned to the PCI-X device, thus indicating to the bridge 26A–D that the first buffer has finished returning the data. Therefore, the bridge 26A–D waits until a signal is received, indicating that the first buffer has finished returning the data (block 184). If there is no indication that the buffer has finished returning the data, then the logic device waits until an indication is given that the buffer has finished reading the data (block 186). However, if the allocation does not require two buffers (block 172), then the data is returned as soon as a legal PCI-X transaction can be initiated (block 188).

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for processing a read block transaction requested from a PCI-X device, the method comprising the acts of:

a) determining whether a read block transaction having a starting address and a ending address crosses a memory boundary;

b) if the read block transaction crosses the memory boundary, reading data from the starting address to the memory boundary into a buffer and rolling a page after the data in the buffer has been read from the starting address to the memory boundary and the data has been returned to the requesting agent; and c) reading data from the memory boundary to the ending address of the read block transaction into the buffer.

2. The method as in claim 1, wherein act (a) comprises the acts of:

determining whether the starting address is aligned with the memory boundary;

determining whether a sum of the starting address and byte count of the read block transaction exceeds the memory boundary; and if the starting address is not aligned with the memory boundary and if the sum of the starting address and byte count is equal to the memory boundary, providing an indication that the read block transaction crosses the memory boundary.

3. The method as in claim 2, wherein the act of providing an indication comprises the act of setting a page roll attribute to a logical 1.

4. The method as in claim 1, wherein if the read block transaction does not cross the memory boundary, reading data from the starting address to the ending address into the buffer.

5. The method as in claim 1, wherein act (a) comprises the act of computing whether the read block transaction crosses the memory boundary by adding the starting address of the read block transaction and the byte count of the read block transaction.

6. The method as in claim 1, wherein the act of rolling the page comprises the act of reading data from the memory boundary to the ending address into the buffer.

7. The method as in claim 1, further comprising the act of delivering data from the buffer to the PCI-X device.

8. The method as in claim 1, wherein the memory boundary is equal to 4 KB.

9. The method as in claim 1, wherein a byte count for the read block transaction is 4 KB.

10. The method as in claim 1, wherein acts (a) through (c) are performed in the recited order.

11. A system for processing a read block transaction requested from a PCI-X device, comprising:

means for determining whether a read block transaction having a starting address and an ending address crosses a memory boundary;

means for reading data from the starting address up to the memory boundary into a buffer, if the read block transaction crosses the memory boundary;

means for reading data from the memory boundary to the ending address of the read block transaction into the buffer; and means for rolling the page after the read block transaction from the starting address to the memory boundary is delivered to the PCI-X device.

12. The system of claim 11, wherein the determining means comprises:

means for determining whether the starting address is aligned with the memory boundary;

means for determining whether a sum of the starting address and byte count of the read block transaction exceeds the memory boundary; and means for providing an indication that the read block transaction crosses the memory boundary, if the starting address is not aligned with the memory boundary.

13. The system of claim 12, wherein the means for providing an indication that the read block transaction crosses the memory boundary comprises means for setting a page roll.

14. The system of claim 11, further comprising means for reading data from a starting address to the ending address into the buffer, if the read block transaction does not cross the memory boundary.

15. The system of claim 11, further comprising means for calculating whether the read block transaction crosses the memory boundary by adding the starting address and read block transaction byte count.

16. The system of claim 11, wherein the means for rolling the page comprises means for reading data from the memory boundary to the ending address into the buffer.

17. The system of claim 11, further comprising means for delivering data from the buffer to the PCI-X device.

18. The system of claim 11, further comprising means for determining whether a read block transaction having a starting address and a ending address crosses a 4 KB memory boundary.

19. A tangible medium for processing a read block transaction requested from a PCI-X device, the tangible medium comprising:
- a routine for determining whether the starting address is aligned with the memory boundary;
- a routine for determining whether a sum of the starting address and byte count of the read block transaction exceeds the memory boundary;
- a routine for providing an indication that the read block transaction crosses the memory boundary, if the starting address is not aligned to the memory boundary;
- a routine for reading data from the starting address up to the memory boundary into a buffer, if the read block transaction crosses the memory boundary; and
- a routine for reading data from the memory boundary to the ending address of the read block transaction into the buffer and wherein the routine for providing an indication comprises a routine for rolling the page after reading the read block transaction from the starting address up to the memory boundary.

20. The tangible medium as recited in claim 19, wherein the routine for providing an indication comprises:
- a routine for providing an indication that the read block transaction crosses the memory boundary; and
- a routine for setting a page roll attribute to a logical 1.

21. The tangible medium as in claim 19, wherein the routine for determining whether the sum of the starting position address and byte count of the read block transaction comprises a routine for calculating whether the read block transaction crosses the memory boundary by adding the starting address and the byte count of the read block transaction.

22. The tangible medium as in claim 19, further comprising a routine for delivering data from the buffer to the PCI-X device.

23. The tangible medium as in claim 19, further comprising a routine for reading data from the starting address up to a 4 KB memory boundary into a buffer.

24. The tangible medium as in claim 19, wherein the tangible medium comprises at least one of a read only memory, a random access memory, a disc, an application specific integrated circuit, and a programmable logic device.

25. A system for processing a read block transaction requested from a PCI-X device comprising:
- at least one processor;
- a memory operatively coupled to the at least one processor; and
- at least one bridge operatively coupled to the memory and configured to receive a read block transaction, the bridge configured to determine whether a read block transaction having a starting address and an ending address transaction crosses a memory boundary, wherein if the block transaction crosses the memory boundary read data from the starting address to the memory boundary into a buffer, and read data from the memory boundary to the ending address of the read block transaction into the buffer, and wherein the bridge is further configured to set a page roll attribute to a logical one if the read block transaction crosses the memory boundary.

26. The system of claim 25, wherein the bridge determines whether the starting address is aligned to the memory boundary.

27. The system of claim 25, wherein the bridge provides an indication that the read block transaction crosses the memory boundary, if the starting address is not aligned to the memory boundary.

28. The system of claim 25, wherein data from the starting address to the ending address is read into the buffer, if the read block transaction does not cross the memory boundary.

29. The system of claim 25, wherein the bridge computes whether the memory boundary is crossed by the read block transaction by adding the starting address and byte count of the read block transaction.

30. A system for processing a read block transaction requested from a PCI-X device comprising:
- at least one processor;
- a memory operatively coupled to the at least one processor; and
- at least one bridge operatively coupled to the memory and configured to receive a read block transaction, the bridge configured to determine whether a read block transaction having a starting address and an ending address transaction crosses a memory boundary, wherein if the block transaction crosses the memory boundary read data from the starting address to the memory boundary into a buffer, and read data from the memory boundary to the ending address of the read block transaction into the buffer, and wherein the bridge is further configured to initiate a page roll, the page roll being active after the data is read from the starting address to the memory boundary and delivered to the requesting device.

31. The system of claim 25, wherein the bridge delivers data from the buffer to the PCI-X device.

32. The system of claim 25, wherein the memory boundary is equal to 4 KB.

* * * * *